(12) United States Patent
Branning

(10) Patent No.: US 10,239,401 B2
(45) Date of Patent: Mar. 26, 2019

(54) ELECTRIC MOTOR AND GEARING ASSEMBLY

(71) Applicant: Auburn Gear, LLC, Auburn, IN (US)

(72) Inventor: Isaac D. Branning, Arcola, IN (US)

(73) Assignee: AUBURN GEAR, LLC, Auburn, IN (US)

( * ) Notice: Subject to any disclaimer, the term of this patent is extended or adjusted under 35 U.S.C. 154(b) by 132 days.

(21) Appl. No.: 15/412,369

(22) Filed: Jan. 23, 2017

(65) Prior Publication Data

US 2018/0208043 A1   Jul. 26, 2018

(51) Int. Cl.
*F16H 1/28* (2006.01)
*B60K 6/405* (2007.10)
(Continued)

(52) U.S. Cl.
CPC .............. *B60K 6/405* (2013.01); *B60K 6/26* (2013.01); *B60K 6/365* (2013.01); *B60K 6/48* (2013.01);
(Continued)

(58) Field of Classification Search
CPC . H02K 5/05; H02K 5/15; H02K 7/116; H02K 15/14; H02K 37/24; B60B 35/125; B60K 2001/006; B60K 1/02; B60K 7/0007; B60K 2007/0092; B60K 17/046; F16H 1/28; F16H 57/08; F16H 57/0018; F16H 2700/00
See application file for complete search history.

(56) References Cited

U.S. PATENT DOCUMENTS

| | | |
|---|---|---|
| 3,267,311 A | 8/1966 | Lamparty |
| 4,441,462 A | 4/1984 | Budinski |
| | (Continued) | |

FOREIGN PATENT DOCUMENTS

| | | |
|---|---|---|
| EP | 0 939 247 A2 | 9/1999 |
| FR | 2714135 A1 | 6/1995 |
| JP | 2003314634 | 11/2013 |

OTHER PUBLICATIONS

European Search Report, EP 17207057, dated Jun. 21, 2018, 16 pages.
(Continued)

*Primary Examiner* — Mark J Beauchaine
(74) *Attorney, Agent, or Firm* — Bose McKinney & Evans LLP

(57) ABSTRACT

An apparatus with an electric motor including a stator and a rotor; a shaft secured to the rotor; a gearing assembly coupled with the shaft; and a housing assembly defining a non-partitioned interior space housing both the electric motor and gearing assembly. The shaft may be unsupported by bearing assemblies and/or free of oil seals and similar sealing engagements between the electric machine and gearing assembly. The motor may be an axial flux motor having a single stator. The gearing assembly may be a planetary reduction gear assembly with a sun gear mounted on the shaft. The apparatus may include only a single electric motor or include a second electric motor and second gearing assembly. The embodiments having a single motor may be used to drive a fan or a vehicle wheel. The embodiments having two motors may be used as a differential drive.

21 Claims, 12 Drawing Sheets

(51) Int. Cl.
*B60K 11/06* (2006.01)
*B60K 6/365* (2007.10)
*B60K 6/26* (2007.10)
*B60K 6/48* (2007.10)
*F16H 57/02* (2012.01)
*H02K 21/24* (2006.01)
*H02K 5/173* (2006.01)
*H02K 7/08* (2006.01)
*H02K 7/116* (2006.01)
*H02K 16/00* (2006.01)
*H02K 9/19* (2006.01)

(52) U.S. Cl.
CPC ............ *B60K 11/06* (2013.01); *F16H 1/28* (2013.01); *F16H 57/02* (2013.01); *H02K 5/1732* (2013.01); *H02K 7/083* (2013.01); *H02K 7/116* (2013.01); *H02K 21/24* (2013.01); *B60Y 2200/92* (2013.01); *B60Y 2400/607* (2013.01); *B60Y 2400/73* (2013.01); *F16H 2057/02034* (2013.01); *F16H 2057/02052* (2013.01); *H02K 9/19* (2013.01); *H02K 16/00* (2013.01); *Y10S 903/906* (2013.01); *Y10S 903/911* (2013.01); *Y10S 903/915* (2013.01)

(56) References Cited

U.S. PATENT DOCUMENTS

| | | | |
|---|---|---|---|
| 5,168,946 A | | 12/1992 | Dorgan |
| 5,267,915 A | | 12/1993 | Estabrook |
| 5,372,213 A | * | 12/1994 | Hasebe ............... B60K 1/02 180/65.6 |
| 5,711,387 A | * | 1/1998 | Murata ............... B60K 11/04 180/68.1 |
| 6,255,751 B1 | | 7/2001 | Hoffmann |
| 6,719,662 B2 | | 4/2004 | Forrest et al. |
| 6,852,061 B2 | | 2/2005 | Schoon |
| 6,892,837 B2 | | 5/2005 | Simmons et al. |
| 6,914,410 B2 | | 7/2005 | Morgante et al. |
| 6,986,260 B2 | | 1/2006 | Oda et al. |
| 7,314,105 B2 | | 1/2008 | Varela |
| 8,133,143 B2 | | 3/2012 | Schoon |
| 8,449,424 B2 | | 5/2013 | Schoon |
| 8,777,793 B2 | | 7/2014 | Sheridan |
| 8,858,385 B2 | | 10/2014 | Forrest et al. |
| 2003/0189388 A1 | * | 10/2003 | Hashimoto ......... H02K 7/116 310/268 |
| 2003/0203782 A1 | | 10/2003 | Casey et al. |
| 2006/0016630 A1 | | 1/2006 | Yang |
| 2006/0120903 A1 | | 6/2006 | Iwasaki et al. |
| 2009/0155103 A1 | | 6/2009 | DeFilippis et al. |
| 2009/0312134 A1 | | 12/2009 | Schoon |
| 2014/0332294 A1 | | 11/2014 | Soma' et al. |
| 2015/0065283 A1 | | 3/2015 | Nilsson et al. |
| 2015/0273940 A1 | | 10/2015 | Forrest et al. |
| 2016/0201763 A1 | | 7/2016 | Sinkko et al. |

OTHER PUBLICATIONS

Office Action in Canadian Patent Application 2,988,922, dated Sep. 4, 2018, 4 pages.

* cited by examiner

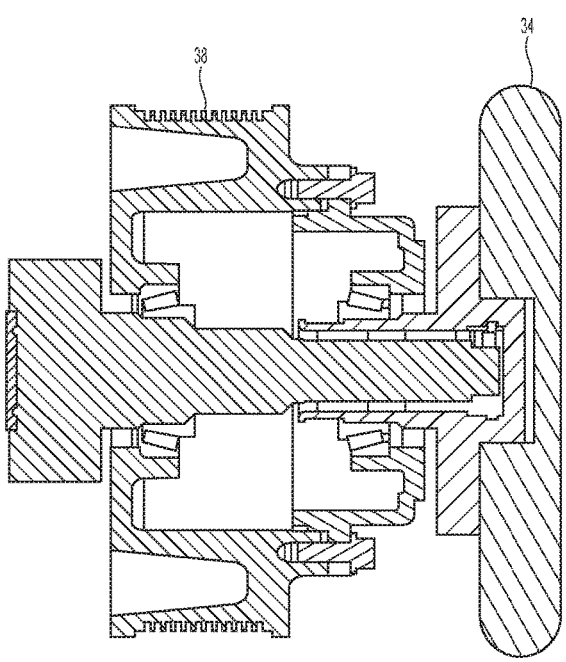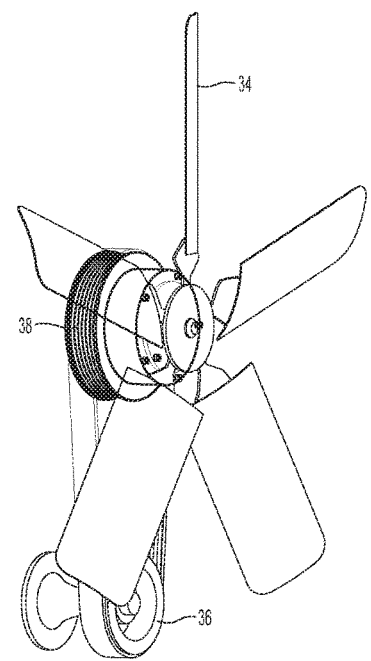
Fig. 1
(Prior Art)
Fig. 2
(Prior Art)

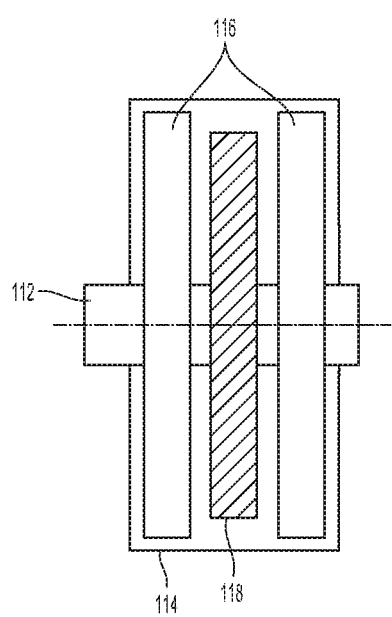 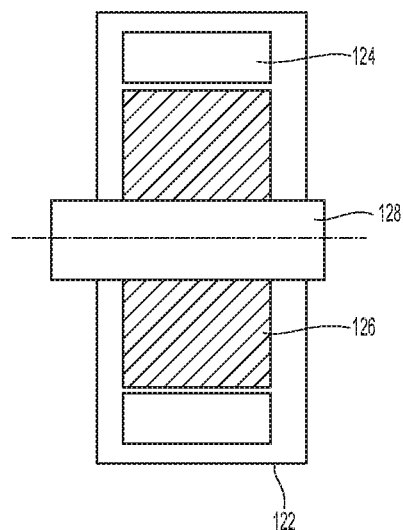
*Fig. 12*  *Fig. 13*

ELECTRIC MOTOR AND GEARING ASSEMBLY

BACKGROUND

1. Technical Field

The present disclosure relates to electric motors coupled with gearing assemblies.

2. Description of the Related Art

Electric motors are often used in combination with gearing assemblies. When used in vehicles or other mobile equipment, the space available for such electric motors and gearing assemblies is often limited. A variety of assemblies that combine an electric motor with a gearing assembly are known.

FIGS. 3 and 4 illustrate known examples of assemblies that include both an electric motor and gearing assembly. In FIG. 3, an electric motor 20 and a gearing assembly 22 are disposed within a housing assembly 24. The housing assembly 24 includes a partition member 26 separating the electric motor 20 from the gearing assembly 22. A shaft 28 couples the electric machine 20 with gearing assembly 22 and an oil seal 30 is engaged with shaft 28 between electric motor 20 and gearing assembly 22 and prevents oil from migrating from one side of partition member 26 to the other. Partition member 26 also supports a bearing member 32 engaged with shaft 28 at a position between electric motor 20 and gearing assembly 22. Bearing member 32 is one of the bearings rotatably supporting shaft 28.

The assembly depicted in FIG. 4 has a more elongate configuration than the assembly of FIG. 3, however, it also includes an electric machine 20a coupled with a gearing assembly 22a. In both FIG. 3 and FIG. 4, the gearing assembly is a planetary reduction gear assembly. A housing partition member 26a separates electric machine 20a from gearing assembly 22a and a shaft assembly 28a extends therethrough coupling electric machine 20a with gearing assembly 22a. Partition member 26a supports a bearing member 32a engaged with a shaft assembly 28a at a location between electric machine 20a and gearing assembly 22a. Bearing member 32a is one of the bearings rotatably supporting shaft assembly 28a. Bearing members 32, 32a of FIGS. 3 and 4 are both roller bearing assemblies. An oil seal 30a is engaged with shaft assembly 28a at a location between electric machine 20a and gearing assembly 22a and seals the space housing gearing assembly 22a from the space housing electric machine 20a.

FIG. 5 illustrates how an electric machine 20b can be coupled with a gearing assembly 22b and coupled with a transaxle 21b to drive a pair of wheels in a vehicle. Examples of other known electric motor and gearing assemblies are disclosed in U.S. Pat. Nos. 6,852,061 B2 and 8,449,424 B2 and in U.S. Pub. No. 2009/0312134 A1 all of which are hereby incorporated herein by reference.

Other rotary drive applications are also found in vehicles and other mobile equipment that commonly utilize drive sources other than electric motors. For example, FIGS. 1 and 2 show a known arrangement for coupling a cooling fan with an internal combustion engine (not shown). As is well known to those having ordinary skill in the art, a driven pulley 36 can be coupled by a belt to a pulley 38 which, in turn, drives a fan 34. Fan 34 may be used to cool the internal combustion engine or other vehicle assembly. Because the fan is driven by a belt and pulley arrangement that takes torque from the engine, the fan is generally positioned in front of the engine with its rotational axis parallel to the rotational axis of the engine. Any other positioning of the fan would entail a significantly more extensive and complex mechanical linkage between the engine and fan thereby consuming additional space within the engine compartment and increasing costs.

SUMMARY

The present invention provides an apparatus having an electric motor and gearing assembly that is relatively compact and well suited for a variety of uses such as in vehicles and other mobile equipment where a compact configuration is particularly beneficial.

The invention comprises, in one form thereof, an apparatus that includes an electric motor including a stator operably coupled with a rotor; a shaft secured to the rotor; a gearing assembly drivingly coupled with the shaft; and a housing assembly defining a non-partitioned interior space housing both the electric motor and the gearing assembly.

In some embodiments, the shaft is rotatably supported on a plurality of bearing supports with the shaft being unsupported between the electric motor and the gearing assembly.

In some embodiments, the shaft is free of sealing engagement between the electric motor and gearing assembly.

In some embodiments, the housing assembly is free of inwardly projecting structures disposed between the electric motor and the gearing assembly.

The electric motor may take the form of an axial flux motor. For example, it may take the form of a single stator axial flux motor.

The gearing assembly may take the form of a planetary reduction gear assembly. Such a planetary reduction gear assembly may include a sun gear mounted on the shaft.

In some embodiments, the electric motor consists of only a single electric motor disposed within the housing assembly. In such an embodiment having a single electric motor, the gearing assembly may be operably coupled with a fan. Such an embodiment may also be disposed in a vehicle having an internal combustion engine wherein the fan is positioned to cool the internal combustion engine and the rotational axis of the fan is non-parallel with the rotational axis defined by the internal combustion engine.

In other embodiments having a single electric motor, the apparatus may be disposed in a vehicle with the gearing assembly operably coupled to a driven wheel of the vehicle.

In yet other embodiments, the apparatus may additionally include a second electric motor including a second stator operably coupled with a second rotor; a second shaft rotatably secured to the second rotor; and a second gearing assembly drivingly coupled with the second shaft wherein the housing assembly defines a second non-partitioned interior space housing both the second electric motor and the second gearing assembly.

In such an embodiment including a second electric motor, the non-partitioned interior space housing both the electric motor and the gearing assembly and the second non-partitioned interior space housing both the second electric motor and the second gearing assembly may be separated by a partition member.

In such an embodiment including a partition member, the partition member may support a first bearing support for rotatably supporting the shaft and a second bearing support for rotatably supporting the second shaft. Alternatively or additionally, the electric motor and the second electric motor may be axial flux motors with the partition member further supporting the stator and the second stator.

In the embodiments including a second electric motor, the apparatus may take the form of a differential drive adapted to be mounted in a vehicle with the gearing assembly being operably coupled to a first wheel and the second gearing assembly being operably coupled to a second wheel.

In some embodiments of the apparatus, the electric motor is an axial flux motor; the gearing assembly is a planetary gear assembly having a sun gear mounted on the shaft and the shaft is rotatably supported on a plurality of bearing supports with the shaft being unsupported and free of sealing engagement between the electric motor and the gearing assembly.

In some embodiments of the apparatus of the preceding paragraph, the electric motor consists of a single electric motor disposed within the housing assembly. In other embodiments, the apparatus further includes a second electric motor including a second stator operably coupled with a second rotor; a second shaft rotatably secured to the second rotor; a second gearing assembly drivingly coupled with the second shaft wherein the housing assembly defines a second non-partitioned interior space housing both the second electric motor and the second gearing assembly; and wherein the second electric motor is an axial flux motor; the second gearing assembly is a planetary gear assembly having a sun gear mounted on the shaft and wherein the second shaft is rotatably supported on a second plurality of bearing supports with the second shaft being unsupported and free of sealing engagement between the second electric motor and the second gearing assembly.

In some variants of the embodiment having two electric motors and planetary gear assemblies, the non-partitioned interior space housing both the electric motor and the gearing assembly and the second non-partitioned interior space housing both the second electric motor and the second gearing assembly are separated by a partition member with the partition member supporting one of the plurality of the bearing supports for rotatably supporting the shaft and one of the second plurality of bearing supports for rotatably supporting the second shaft and wherein the partition member further supports the stator and the second stator.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein:

FIG. 1 is a cross sectional view of a prior art fan drive.

FIG. 2 is a perspective view of a prior art fan drive.

FIG. 12 is a schematic representation of an axial flux electric motor having two stators.

FIG. 13 is a schematic representation of a radial flux electric motor.

Figure 3:
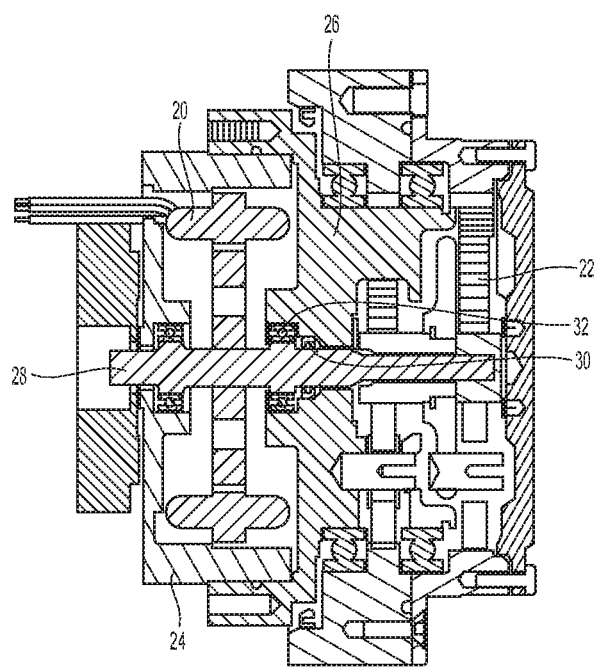
FIG. 3 is a cross sectional view of a prior art electric motor and gear assembly.
Figure 4:
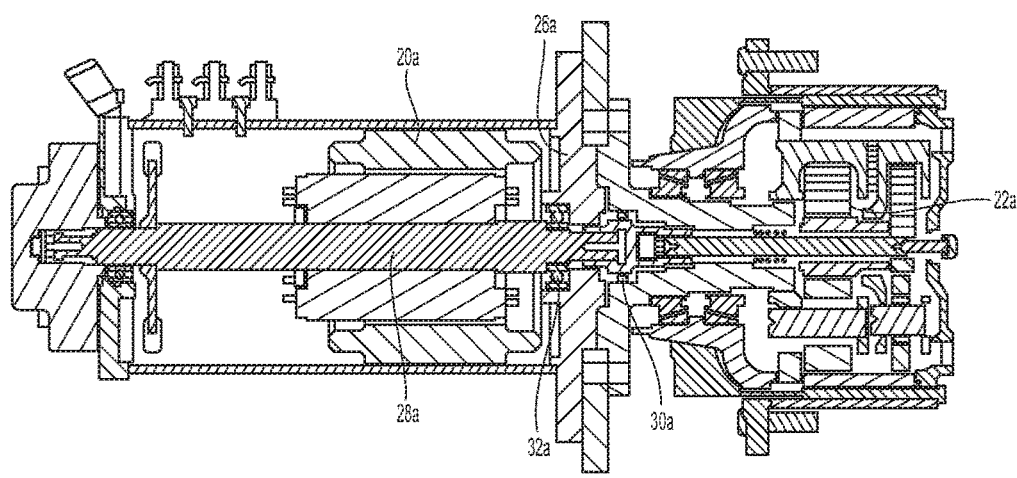
FIG. 4 is a cross sectional view of another prior art electric motor and gear assembly.
Figure 5:
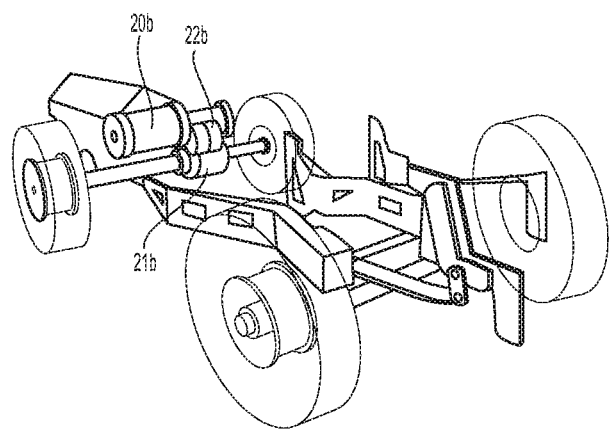
FIG. 5 is a perspective view of a prior art electric motor coupled with a differential drive.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

Figure 6:
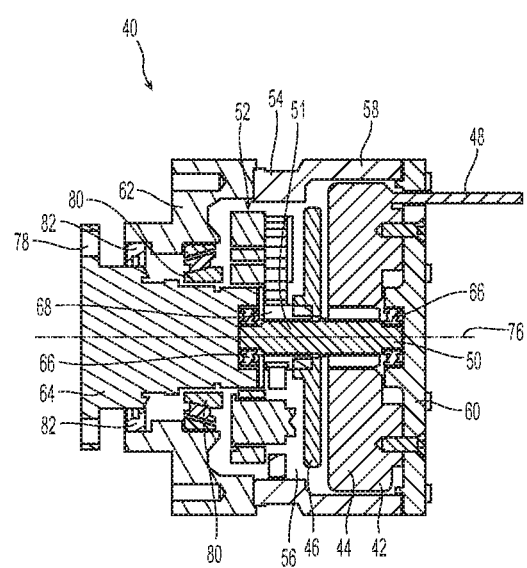
FIG. 6 is a cross sectional view of an electric motor and gear assembly.

An apparatus 40 having an electric motor 42 with a stator 44 operably coupled with a rotor 46 is shown in FIG. 6. Electrical leads 48 supply power and control signals to motor 42. In the embodiment depicted in FIG. 6, electric motor 42 is an axial flux motor having a single stator. The manufacture and operation of axial flux motors is well known to those having ordinary skill in the art. It is additionally noted that while apparatus 40 is shown having a single stator axial flux electric motor, alternative embodiments may employ alternative electric motor designs. For example, FIG. 12 schematically depicts an axial flux electric motor 114 with two stators 116 and FIG. 13 schematically depicts a radial flux electric motor 122. Electric motors having either of these two basic designs could also be used with the apparatus disclosed herein. The spatial and performance demands of the particular application, together with cost of the motor, are all factors that will determine the most suitable electric motor design for a particular application. As a general rule, axial flux motors will have a shorter axial length and a larger diameter than a radial flux motor having the same power. Single stator axial flux electric machines have a compact axial length that will often make such motors suitable for use with planetary gear assemblies where a compact design is advantageous.

A shaft 50 is secured to and rotates with rotor 46. Shaft 50 is also coupled with and rotatably drives gearing assembly 52. In the illustrated embodiment, shaft 50 is a unitary shaft, however, in alternative embodiments, shaft 50 could be formed by securing two or more shorter shafts together to form a shaft assembly that functions as a unitary shaft. The illustrated shaft 50 includes splines by which it is secured to rotor 46 and gearing assembly 52, however, alternative methods of engagement may also be used.

A housing assembly 54 defines a non-partitioned interior space 56 within which both electric motor 42 and gearing assembly 52 are enclosed. In the embodiment of FIG. 6, housing assembly 54 includes a main housing 58 having a generally cylindrical shape, an end plate 60 disposed proximate electric motor 42 and a housing member 62 that functions as a bearing sleeve for output member 64. As mentioned above, interior space 56 is non-partitioned and housing assembly 54 does not include any partition walls disposed between electric motor 42 and gearing assembly 52. In other words, housing assembly 54 is free of inwardly projecting structures disposed between the electric motor 42 and the gearing assembly 52.

Shaft 50 is rotatably supported on a plurality of bearing supports 66. In the illustrated embodiment, there are two bearing supports 66 which take the form of roller bearing assemblies, however, other suitable bearing supports may be employed for alternative embodiments and for alternative applications. One of the bearing supports is mounted on end plate 60 while the other is mounted on output member 64. That portion 51 of shaft 50 located between electric motor 42 and gearing assembly 52 is not supported by a bearing support. In other words, shaft 50, between electric motor 42 and gearing assembly 52, is unsupported. Conventionally, a bearing support would be used to support the shaft of extending from an electric motor immediately adjacent each end of the motor. The omission of such a bearing support between electric motor 42 and gearing assembly 52 allows apparatus 40 to have a more compact configuration.

Figure 8:
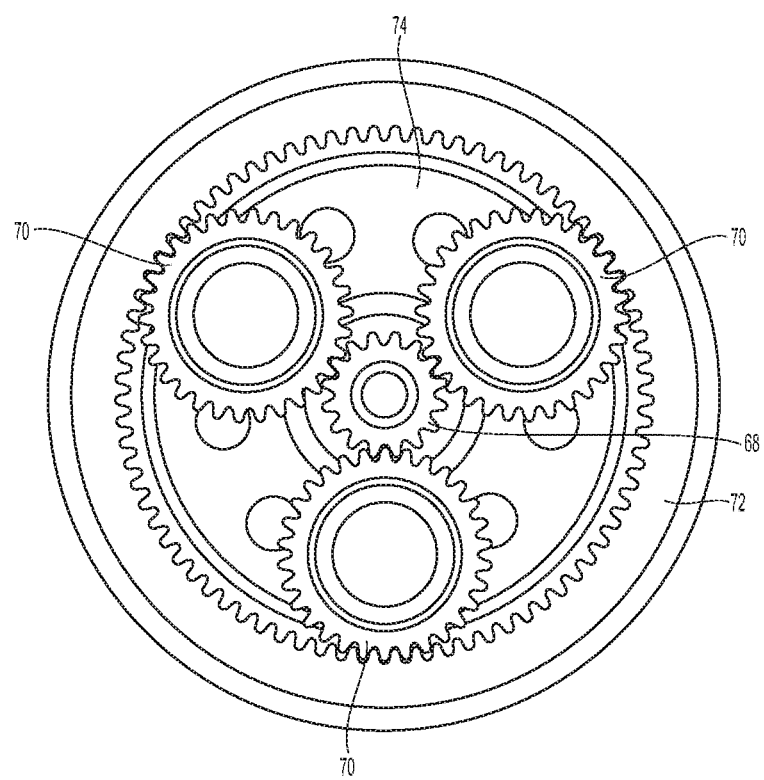
FIG. 8 is an end view of a planetary gear reduction assembly.

In the embodiment of FIG. 6, gearing assembly 52 is a planetary reduction gear assembly. A sun gear 68 is rotationally secured to shaft 50 with splines. As best seen in FIG. 8, three planetary gear 70 are engaged with sun gear 68. A ring gear 72 is mounted on the interior surface of housing assembly 54 and remains fixed relative to housing assembly 54. Planetary gear 70 engage ring gear 72 which controls the movement of planetary gear 70 as they are driven by the rotation of sun gear 68. A carrier 74 has a spindle for each planetary gear 70. Planetary gears 70 rotate relative to the spindle on carrier 74 but as the group of planetary gears rotates relative to axis 76 of shaft 50, carrier 74 is also rotated. Carrier 74 is secured to output member 64 whereby rotation of shaft 50 drives the rotation of output member 64 by means of gearing assembly 52. An attachment flange 78 on output member 64 allows for the attachment of an external device that will, in turn, be rotatably driven by operation of motor 42. The planetary reduction gear assembly depicted in FIG. 8 utilizes straight cut spur gears, however, helical gearing may also be employed and would reduce the noise generated by gearing assembly 52. In still other embodiments, gearing arrangements other than planetary reduction gear assemblies could be employed with apparatus 40.

As can also be seen in FIG. 6, thrust bearings 80 are disposed between housing member 62 and output member 64 and rotatably support output member 64. The bearing support 66 located at the gearing assembly end of shaft 50 is located between output member 64 and shaft 50. In this regard, it is noted that both output member 64 and shaft 50 rotate relative to housing assembly 54.

An oil seal 82 is disposed between housing member 62 and output member 64. Typically, a partition wall affixed to and forming a part of the housing assembly would be positioned between the electric motor and gearing assembly and would support both a bearing assembly engaged with the shaft extending from the rotor and an oil seal engaged with the shaft to sealingly partition the gear assembly from the electric motor. In apparatus 40, there is no oil seal that engages that portion 51 of shaft 50 between electric motor 42 and gearing assembly 52. In other words, shaft 50 is free of sealing engagement between electric motor 42 and gearing assembly 52. In the embodiment of FIG. 6, not only is that portion 51 of shaft 50 located between electric motor 42 and gearing assembly 52 free of sealing engagement, but the entire axial length of shaft 50 is free of sealing engagement.

In the illustrated embodiments, oil within the non-partitioned interior space 56 provides both a lubricant for the gearing assembly and a coolant for the electrical motor. For relatively small embodiments, a closed interior space wherein the oil is not recirculated will often be sufficient. For larger embodiments, an inlet port and outlet port could be provided in the housing to circulate the oil in a circuit having a pump and a heat exchanger whereby the oil is cooled in the heat exchanger and then returned. Still other forms of cooling may also be employed. For example, the housing could define fluid channels to thereby form a water jacket for cooling the apparatus. In such an embodiment, water or other liquid coolant would be circulated through the enclosed channels in the housing assembly without entering the interior space housing the electric motor or gearing assembly. The water/coolant would be circulated by a pump to a heat exchanger to remove heat and then returned.

Figure 7:
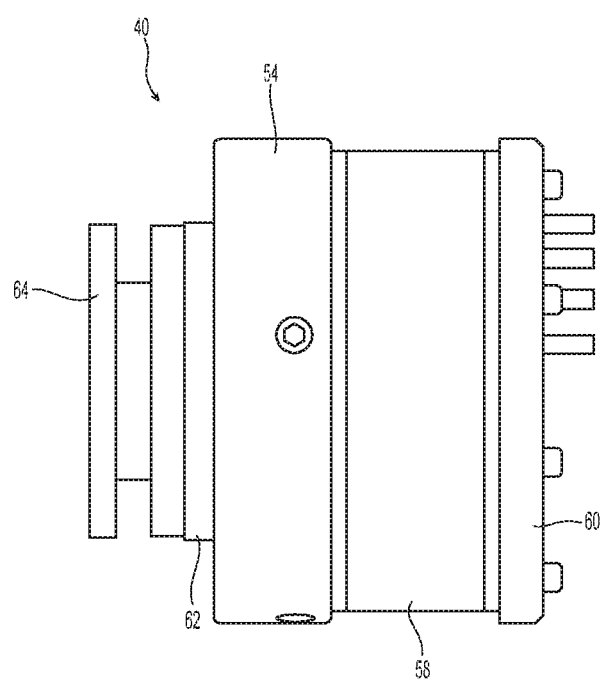
FIG. 7 is a side view of an electric motor and gear assembly apparatus.
Figure 9:
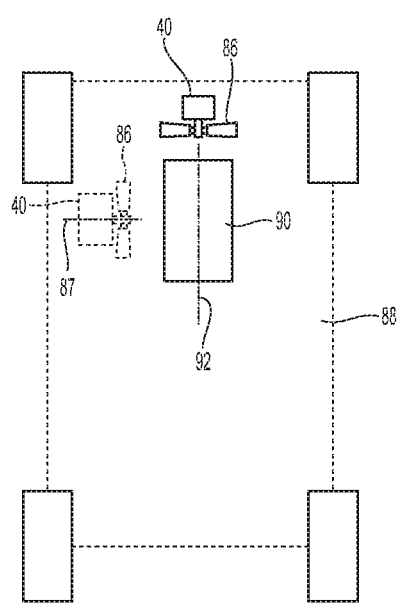
FIG. 9 is a schematic view of a vehicle having an internal combustion engine and an electric machine and gearing assembly coupled with a fan.
Figure 9A:
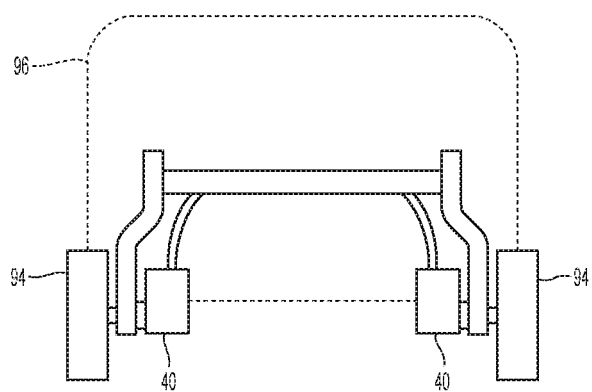
FIG. 9A is a schematic view of a two electric machine and gear assemblies coupled with driven wheels.

FIG. 7 provides an external view of apparatus 40 which may be used in a wide variety of different applications. Two examples of such applications are schematically depicted in FIGS. 9 and 9A. FIG. 9 illustrates an apparatus 40 wherein the gear assembly 52 is coupled to a fan 86 and installed in a vehicle 88 having an internal combustion engine 90. Fan 86 is positioned to cool engine 90. In the orientation shown in solid lines, the rotational axis of fan 86 is positioned parallel with rotational axis 92 defined by engine 90. Axis 92 corresponds to the rotational axis of the crankshaft of internal combustion engine 90. Because apparatus 40 is powered by the electrical system of vehicle 88 and not by a mechanical assembly driven by engine 90, there is greater flexibility in the positioning of fan 86. For example, fan 86 can be positioned such that its rotational axis 87 is non-parallel with rotational axis 92 of engine 90 without creating any additional complexity or cost in the manufacture of vehicle 88 as depicted with dashed lines in FIG. 9.

The use of an electric motor driven fan not only provides for flexibility in positioning of the fan, it also provides for greater control over the speed of the fan and allows the speed to be controllably varied. For example, the speed of the fan could be varied as a function of the engine temperature. It also allows the fan to be operated only when there is a demand for the fan. It could also be used to provide multi-directional air flow by reversing the direction of the motor. The use of such a fan would be particularly useful in larger vehicle applications such as large agricultural and construction equipment and on-highway trucks and tractors. For example, a vehicle employing a QSX15 Tier 4 motor manufactured by Cummins Inc. of Columbus, Ind. could benefit from having a fan powered by an on-demand fan powered by an electrical motor as depicted in FIG. 9 instead of continually draining horsepower from the engine to drive a cooling fan regardless of the engine temperature.

FIG. 9A depicts another application for which an apparatus 40 having a single electric motor 42 is well suited. In this application, two apparatus 40 are used to drive the steerable wheels 94 of vehicle 96. In this example, each wheel 94 is driven by a separate apparatus 40 with the wheel hub of wheels 94 being coupled to gearing assembly 52 of the apparatus 40. The small, compact nature of apparatus 40 makes it suitable for use with driven wheels that are also steerable. In such an embodiment, apparatus 40 may be employed, or, it may be modified such that the rotational axes of the planetary gears remain fixed relative to the housing and the ring gear is drivingly rotated relative to the housing. For example, the ring gear can be fixed relative to the hub of the driven wheel to thereby drive the wheel. U.S. Pat. Pub. 2015/0273940 A1 entitled Wheel Drive Transmission Unit, the disclosure of which is incorporated herein by reference, discloses a wheel drive unit where the ring gear rotates and is fixed to the hub of the driven wheel. A modified apparatus 40 having a planetary gear carrier fixed relative to the housing and a ring gear that rotates relative to the housing can be beneficially employed with large driven wheels such as those used with agricultural, construction and earth moving equipment.

Figure 10:
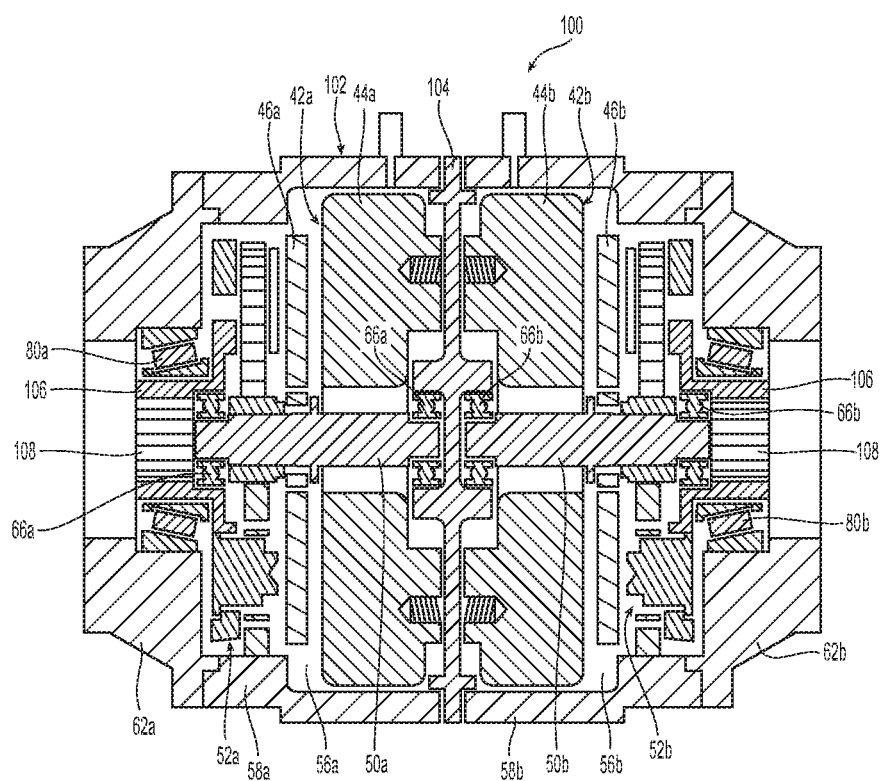
FIG. 10 is a cross sectional view of an apparatus having two electric motors and two gear assemblies.

Another embodiment is shown in FIG. 10. In this embodiment, apparatus 100 includes two electric motors 42a, 42b and two gear assemblies 52a, 52b disposed within a housing assembly 102. The electric motors 42a, 42b of apparatus 100 are single stator axial flux electric motors like those of apparatus 40 with each motor 42a, 42b having a stator 44a, 44b and a rotor 46a, 46b. Gearing assemblies 52a, 52b are planetary reduction gear assemblies having the same configuration as that discussed above with regard to gearing assembly 52 of apparatus 40. Similarly, shafts 50a, 50b have the same configuration as shaft 50.

Housing assembly 102 includes two main housing members 58a, 58b having a generally cylindrical shape and two housing members 62a, 62b mounted on the distal ends of housing members 58a, 58b. Housing assembly 102 also includes a partition member 104 that separates the interior of housing assembly 102 into two separate non-partitioned interior spaces 56a, 56b. Space 56a houses motor 42a and gear assembly 52a while space 56b houses motor 42b and gear assembly 52b.

Similar to shaft 50, shaft 50a is supported on bearings supports 66a while shaft 50b is supported by bearing supports 66b wherein shaft 50a is unsupported between electric motor 42a and gearing assembly 52a and shaft 50b is unsupported between electric motor 42b and gearing assembly 52b. Partition member 104 provides structural support for one of the bearing supports 66a and one of the bearing supports 66b similar to the manner in which end plate 60 supported one of the bearing supports 66. Also similar to end plate 60, stators 44a, 44b are secured to and supported by partition member 104. Electrical leads 48a, 48b separately supply electrical power and control signals to electric motors 42a, 42b.

Unlike apparatus 40, the carrier of gearing assemblies 52a, 52b is secured to an output member 106 that has a splined bore 108 instead of an external flange. Splined bore 108 can be readily connected with an axle or similar drive shaft component for rotatably driving a wheel of a vehicle. In this regard, it is noted that the apparatus 40 depicted in FIG. 9A would advantageously benefit from having a splined bore. Similar to output member 64, output members 106 are rotatably supported on housing assembly 102 by thrust bearings 80a, 80b and have a bearing support 66a, 66b mounted thereon for supporting shafts 50a, 50b.

The shafts inserted into splined bores 108 will extend through openings in housing members 62a, 62b. Oil seals (not shown) may be positioned between the shafts and housing members 62a, 62b to seal interior spaces 56a, 56b. The shafts engaged with bores 108 will be configured to meet the needs of the particular application and may include a yoke at the opposing end whereby such shafts can be engaged in a U-joint or similar joint that allows for relative movement at the joint while still transmitting torque.

Figure 11:
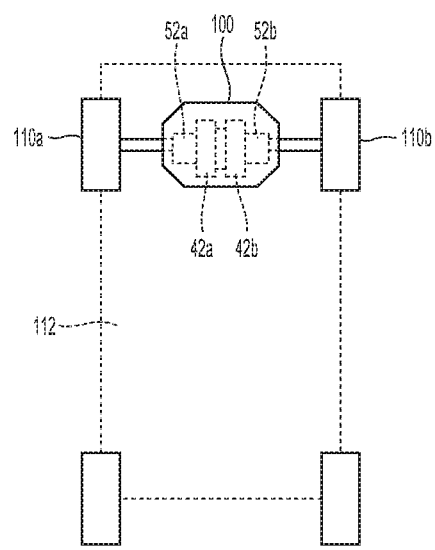
FIG. 11 is a schematic view of a vehicle having a differential drive formed by the apparatus of FIG. 10.

Apparatus 100 with its two separately controllable motors 52a, 52b respectively driving gear assemblies 52a, 52b can be used as a differential drive as depicted in FIG. 11. In the embodiment depicted in FIG. 11, gearing assembly 52a is drivingly coupled to a first wheel 110a and gearing assembly 52b is drivingly coupled to a second wheel 110b of vehicle 112 wherein the rotational axes of wheels 110a, 110b are concentric.

The use of such a differential drive has a wide variety of uses. Such uses include, but are not limited to ground support equipment at airports, golf carts, mobility carts, mowers, and no-emission vehicles. Because the two electric motors are independently controllable and variable speed, the differential drive can be operated in different modes as the need arises or upon the selection of the operator. For example, the unit could be operated to provide torque vectoring, an open differential mode, a limited slip differential mode, or a locked differential mode. The unit is also scalable and is suitable for use with both small and large vehicles. The relatively small and compact nature of the apparatus provides the potential that it can be used to modify an existing vehicle and use the existing axle housing. In this regard, it is noted that FIG. 11 is not to scale.

It is also noted that several of the applications described herein involve vehicles. As used herein the term vehicle is not limited to automobiles and trucks but includes all mobile equipment such as mobile industrial and agricultural equipment and regardless of whether or not such mobile equipment is used to transport human operators thereon.

As mentioned above, FIG. 12 schematically depicts an axial flux motor 114 having two stators 116. Motor 114 also includes a rotor 118 operably coupled with a shaft. FIG. 13 schematically depicts a radial flux electric motor 122 having a stator 124 that circumscribes rotor 126. A shaft 128 is coupled with rotor 126.

It is additionally noted that the illustrated embodiments do not illustrate any motor position feedback. The use of position and or speed sensors with a motor shaft is well known in the art and such sensors and would facilitate greater control over the operation of the motor. In this regard it is noted that such sensors could be disposed at the end of the shaft proximate either end plate 60 or partition member 104.

While this invention has been described as having an exemplary design, the present invention may be further modified within the spirit and scope of this disclosure. This application is therefore intended to cover any variations, uses, or adaptations of the invention using its general principles.

What is claimed is:

1. An apparatus comprising:
   an electric motor including a stator operably coupled with a rotor;
   a shaft secured to the rotor;
   a gearing assembly drivingly coupled with the shaft;
   a housing assembly defining a non-partitioned interior space housing both the electric motor and the gearing assembly; and
   wherein the shaft is directly rotatably supported on a pair of bearing supports, wherein the shaft is unsupported between the electric motor and the gearing assembly and wherein the electric motor and the gearing assembly are both disposed along the shaft between the pair of bearing supports.

2. The apparatus of claim 1 wherein the shaft is secured to and rotates with the rotor and wherein the shaft communicates rotation of the rotor directly to the gearing assembly whereby it functions as a unitary shaft.

3. The apparatus of claim 2 wherein the entire axial length of the shaft is free of sealing engagement.

4. The apparatus of claim 1 wherein the electric motor is an axial flux motor.

5. The apparatus of claim 4 wherein the electric motor is a single stator axial flux motor.

6. The apparatus of claim 1 wherein the gearing assembly is a planetary reduction gear assembly.

7. The apparatus of claim 6 wherein the gearing assembly includes a sun gear mounted on the shaft.

8. The apparatus of claim 1 wherein the electric motor consists of a single electric motor disposed within the housing assembly.

9. The apparatus of claim 8 wherein the gearing assembly is operably coupled with a fan.

10. The apparatus of claim 9 wherein the apparatus is disposed in a vehicle having an internal combustion engine, the fan being positioned to cool the internal combustion engine and wherein a rotational axis of the fan is non-parallel with a rotational axis defined by the internal combustion engine.

11. The apparatus of claim 8 wherein the apparatus is disposed in a vehicle and the gearing assembly is operably coupled with a driven wheel of the vehicle.

12. The apparatus of claim 1 further comprising:
a second electric motor including a second stator operably coupled with a second rotor;
a second shaft rotatably secured to the second rotor;
a second gearing assembly drivingly coupled with the second shaft;
wherein the housing assembly defines a second non-partitioned interior space housing both the second electric motor and the second gearing assembly; and
wherein the second shaft is rotatably supported on a second pair of bearing supports, wherein the second shaft is unsupported between the second electric motor and the second gearing assembly and wherein the second electric motor and the second gearing assembly are both disposed on the second shaft between the second pair of bearing supports.

13. The apparatus of claim 12 wherein the non-partitioned interior space housing both the electric motor and the gearing assembly and the second non-partitioned interior space housing both the second electric motor and the second gearing assembly are separated by a partition member.

14. The apparatus of claim 13 wherein the electric motor and the second electric motor are axial flux motors and the partition member further supports the stator and the second stator.

15. The apparatus of claim 12 wherein the apparatus is a differential drive adapted to be mounted in a vehicle with the gearing assembly being operably coupled to a first wheel and the second gearing assembly being operably coupled to a second wheel.

16. The apparatus of claim 1 wherein the electric motor is an axial flux motor; the gearing assembly is a planetary gear assembly having a sun gear mounted on the shaft and wherein the shaft is free of sealing engagement between the electric motor and the gearing assembly.

17. The apparatus of claim 16 further comprising:
a second electric motor including a second stator operably coupled with a second rotor;
a second shaft rotatably secured to the second rotor;
a second gearing assembly drivingly coupled with the second shaft;
wherein the housing assembly defines a second non-partitioned interior space housing both the second electric motor and the second gearing assembly; and
wherein the second electric motor is an axial flux motor; the second gearing assembly is a planetary gear assembly having a sun gear mounted on the shaft and wherein the second shaft is rotatably supported on a second pair of bearing supports and wherein the second shaft is unsupported and is free of sealing engagement between the second electric motor and the second gearing assembly and wherein the second electric motor and second gearing assembly are both disposed along the second shaft between the second pair of bearing supports.

18. The apparatus of claim 17 wherein the non-partitioned interior space housing both the electric motor and the gearing assembly and the second non-partitioned interior space housing both the second electric motor and the second gearing assembly are separated by a partition member, the partition member supporting one of the pair of the bearing supports for rotatably supporting the shaft, the one bearing support of the pair of bearing supports supporting an end of the shaft, wherein the shaft is secured to and rotates with the rotor and wherein the shaft communicates rotation of the rotor to the gearing assembly whereby it functions as a unitary shaft, and one of the second pair of bearing supports for rotatably supporting the second shaft, the one bearing support of the second pair of bearing supports supporting an end of the second shaft, wherein the second shaft is secured to and rotates with the second rotor and wherein the second shaft communicates rotation of the second rotor directly to the second gearing assembly whereby it functions as a unitary shaft, and wherein the partition member further supports the stator and the second stator.

19. An apparatus comprising:
an axial flux electric motor including a stator operably coupled with a rotor;
a shaft secured to the rotor;
a gearing assembly drivingly coupled with the shaft;
a housing assembly defining a non-partitioned interior space housing both the electric motor and the gearing assembly; and
wherein the shaft is rotatably supported on a pair of bearing supports, wherein the shaft is unsupported between the electric motor and the gearing assembly and wherein the electric motor and the gearing assembly are both disposed along the shaft between the pair of bearing supports; and wherein the apparatus further includes:
a second axial flux electric motor including a second stator operably coupled with a second rotor;
a second shaft rotatably secured to the second rotor;
a second gearing assembly drivingly coupled with the second shaft;
wherein the housing assembly defines a second non-partitioned interior space housing both the second electric motor and the second gearing assembly; and
wherein the second shaft is rotatably supported on a second pair of bearing supports, wherein the second shaft is unsupported between the second electric motor and the second gearing assembly and wherein the second electric motor and the second gearing assembly are both disposed on the second shaft between the second pair of bearing supports;
wherein the non-partitioned interior space housing both the electric motor and the gearing assembly and the second non-partitioned interior space housing both the second electric motor and the second gearing assembly are separated by a partition member; and
wherein the partition member supports the stator of the axial flux motor and a first bearing support of the pair of bearing supports, the first bearing support for rotatably supporting an end of the shaft and wherein the partition member supports the second stator of the second axial flux motor and a second bearing support of the second pair of bearing supports, the second bearing support rotatably supporting an end of the second shaft.

20. An apparatus comprising:
an axial flux electric motor including a stator operably coupled with a rotor;
a shaft secured to the rotor;

a gearing assembly drivingly coupled with the shaft;

a housing assembly defining a non-partitioned interior space housing both the electric motor and the gearing assembly;

wherein the shaft is rotatably supported on a pair of bearing supports, wherein the shaft is unsupported between the electric motor and the gearing assembly and wherein the electric motor and the gearing assembly are both disposed along the shaft between the pair of bearing supports; and wherein the housing assembly includes an end plate and wherein the end plate supports the stator and one of the pair of bearing supports, the one bearing support supported by the end plate supporting an end of the shaft.

21. The apparatus of claim 20 wherein the electric motor consists of a single electric motor disposed within the housing assembly.

\* \* \* \* \*